United States Patent Office 3,618,324
Patented Nov. 9, 1971

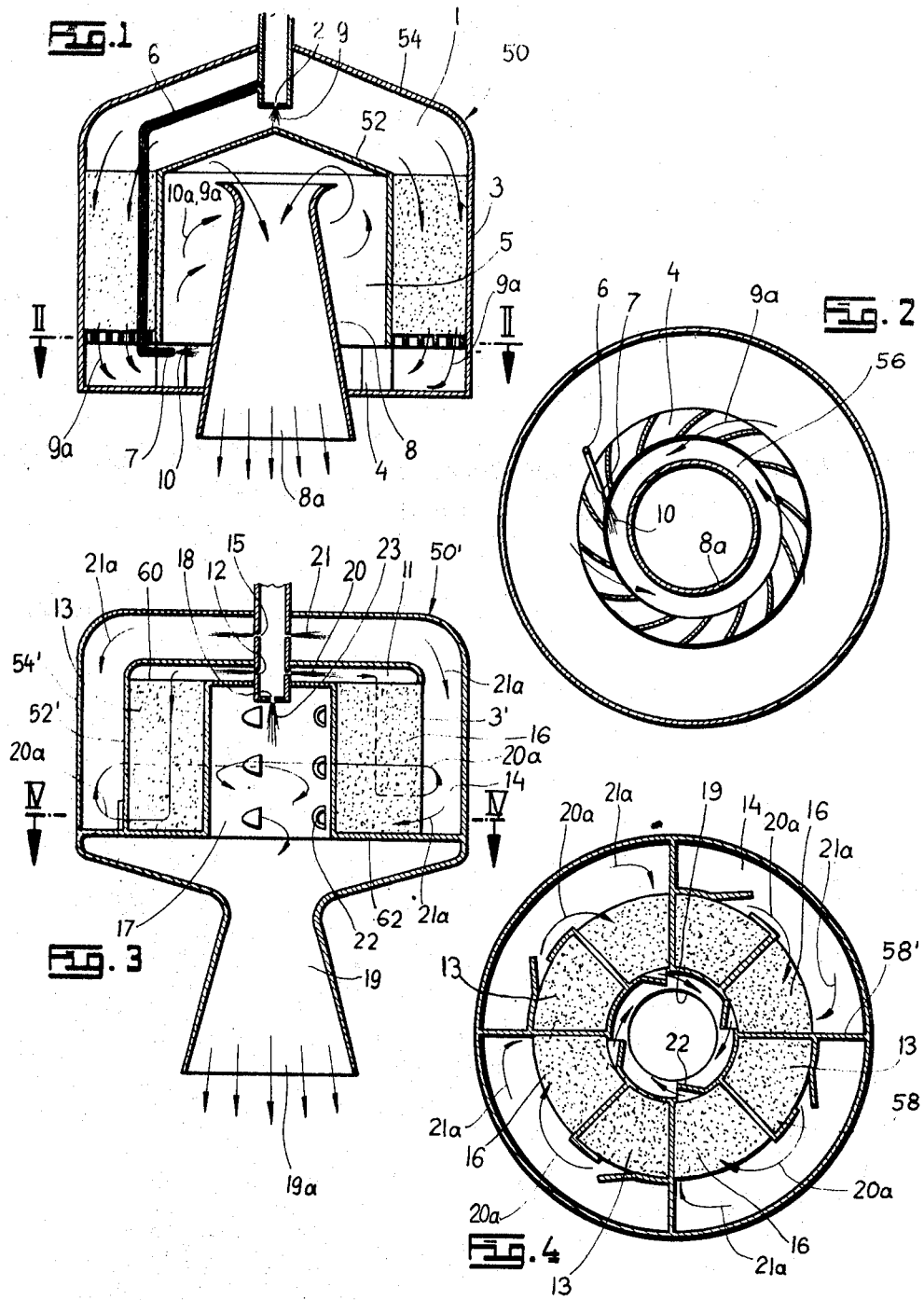

3,618,324
APPARATUS FOR DECOMPOSITION OF A FLUID MONERGOL FOR RUNNING A ROCKET MOTOR
German Munding, Bad Friedrichshall, Germany, assignor to Bolkow Gesellschaft mit beschrankter Haftung, Ottobrunn, near Munich, Germany
Filed Sept. 23, 1968, Ser. No. 767,906
(Filed under Rule 47(b) and 35 U.S.C. 118)
Claims priority, application Germany, Sept. 23, 1967,
P 16 26 066.5
Int. Cl. F02k 9/02
U.S. Cl. 60—258                           10 Claims

ABSTRACT OF THE DISCLOSURE

A method for the decomposing of a fluid Monergol in order to run a gas generator especially for rocket motors comprises dividing the fluid Monergol mass into a plurality of separate Monergol partial masses, separating one of the masses catalytically in an atomized state, and mixing another of the Monergol partial masses in an atomized state with the hot decomposed gases of the first Monergol partial mass so as to thermally decompose the second fluid Monergol partial mass.

An apparatus for carrying out the method of the invention, in one embodiment, includes a housing defining a first injection chamber for injecting a first partial Monergol mass and which is connected to a catalyzator chamber for flow of the atomized liquid mass therethrough, and a second injection chamber located downstream of the catalyzer chamber into which a second partial Monergol mass is directed into the flow stream of the first catalyzed mass. The construction is such that the flow through the catalyzer is in an axial direction and transversely into the injected stream of the second partial mass for return axial flow and entrance into a thrust nozzle for discharge in a reverse direction. The injection nozzle is advantageously arranged in a ring having vanes for producing the tangential whirling flow of the injected partial Monergol mass.

In another embodiment of the invention, a gas generator housing, includes a double wall closed end with a first injection nozzle arranged to discharge a first fluid Monergol mass into the inner wall chamber for flow in an axial direction through the catalyzer arranged as a part of an intermediate ring sector within the housing. The flow of the first mass from the catalyzer is then around a peripheral ring portion between the double walls of the housing and into another ring sector into which a second partial mass is injected. The third partial Monergol mass is added between the wall portions and is directed with the combined first and second partial mass portions in the ring sectors, and flow from the ring sectors is tangentially inwardly to a centrally arranged swirl chamber which opens downwardly or inwardly into a thrust nozzle through which the products are discharged.

SUMMARY OF THE INVENTION

This invention relates, in general, to a method and apparatus for generating gases from a fluid Monergol and, in particular, to a new and useful method and apparatus for generating gases from a fluid Monergol, particularly for running a gas generator such as a rocket motor.

Gas generators especially for rocket motors employing catalytic separation of a fluid Monergol are known. In the known gas generators, the fluid Monergol mass is sent in an atomized state through a catalytic reactor and is separated into separate gases under high heat conditions.

In addition to to the basic advantages afforded by catalytically operated generators they have the disadvantage that the catalytic equipment to separate the Monergols requires a large amount of space in order to satisfactorily fulfill its requirements. This is partiacularly important in respect to the construction of rocket engines particularly for air and space travel. In addition, the catalyzator must be made of expensive metals and therefore the equipment is very expensive to manufacture.

In accordance with the present invention, there is provided a high production gas generator for a simple construction and relatively inexpensive and it may be made to a very small size. This is made possible in accordance with the method of the invention by separating a fluid Monergol gas mass into at least two Monergol parts. One of the Monergol parts is separated catalytically in an atomized state. Another of the fluid partial Monergol masses is mixed in an atomized state into the hot separated gases of the first partial Monergol mass and is therefore split by it thermically. A predetermined ratio is chosen between the two Monergol masses based on the consideration that the catalytically separated Monergol mass must be of a large enough proportion so that the heat capacity of the separated gas is sufficient to separate the second partial Monergol mass by thermal reaction.

In a refinement of the invention, it is also proposed that during the splitting of the fluid Monergol mass into more than two partial fluid Monergol parts in which the first partial Monergol mass which is produced catalytically in an atomized state and which is brought into contact with the second partial Monergol mass of a greater volume and which is also in an atomized state, a further fluid Monergol mass is added in the atomized state to the hot cracked gasses of the previous two and also in a correspondingly increasing amount so that it is thermically separated by the cracked gases of the previous Monergol masses and so on. In order to achieve an absolute control over the complete separation of the first and second partial Monergol masses, they are directed in the specific atomized amounts contained in the cracked gas through a so-called special safety catalyzator.

An additional feature of the invention method and apparatus is that it permits the previously cracked partial Monergol masses to be brought into engagement with a newly introduced partial Monergol mass in the form of a tangential whirling stream. For this purpose, an apparatus comprises, for example, a gas generating chamber housing having an exterior chamber into which the first Monergol mass is introduced. It is arranged so that it will flow through an annular catalyzer chamber and in an axial direction and then transversely through a ring member having tangential blades so that it is whirled into association with a second partial Monergol mass which is introduced at this location. Both gaseous products have been directed in an opposite axial direction and are reversed for flow and discharge out through a nozzle section in the form of thrust gases. Each successive partial Monergol mass is introduced by a nozzle providing for the atomization of the partial Monergol mass.

In accordance with another embodiment of the invention, the gas generator includes an annular catalytic ring sector arranged at a location spaced from the inner wall of a reactor or generator housing. The ring sector is divided up into a purality of individual partial sectors. A first Monergolic mass is introduced, for example, in a manner such that it will flow through one of the catalytic ring sector portions and thence outwardly through this sector portion after some axial flow for contact by a second Monergolic partial mass which is introduced by an injector disposed in a chamber around the catalytic ring. The combined gases of the first and second partial Monergol masses are then directed into a partial ring sector which is referred to a safety catalyzator. The combined products are moved in a whirling direction and a further third Monergolic partial mass is added prior to a third pass through a sector portion of the catalyst mass. The resultant products are directed tangentially into a central whirling chamber which opens at one end to a chamber having a thrust nozzle discharge.

Accordingly, it is an object of the invention to provide a method for the separation of a fluid Monergol to run a gas generator, especially for rocket motors comprising dividing a fluid Monergol mass into at least two separate Monergol partial masses, separating one of said partial masses catalytically while in an atomized state, directing a second fluid Monergol partial mass in an atomized state into the hot decomposed gases of the first partial Monergol mass so as to be intermixed therewith and thermally split by it.

A further object of the invention is to provide an apparatus for generating gas which comprises a housing having a closed end with means for introducing a first Monergolic mass into an injection chamber in an atomized state, the injection chamber being connected to a catalyst chamber through which the first partial Monergol mass is directed, means for introducing a second partial Monergol mass into the hot gases generated in the catalyst chamber by the first partial Monergol mass, and a thrust nozzle arranged to receive the combined gases and for discharging them outwardly.

A further object of the invention is to provide a generator which includes a plurality of separate catalyst chambers with means for successively introducing partial Monergol masses such that each in succession flows through a partial chamber and is then moved passed the injection means for another, with means for tangentially moving the hot gases which are generated so that they intermix with the next injection of the Monergol mass so than the hot decomposed gases cause a splitting of the newly introduced mass, and including one or more means for adding additional partial Monergol masses and for directing the combined decomposed gases through a whirling chamber for directing the gases outwardly through thrust nozzle.

A further object of the invention is to provide an apparatus for generating gases which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a transverse sectional view of a gas generator for a rocket motor constructed in accordance with the invention;

FIG. 2 is a section taken on the line II—II of FIG. 1;

FIG. 3 is a view similar to FIG. 1 of another embodiment of the invention; and

FIG. 4 is a section taken on the line IV—IV of FIG. 3.

DETAILED DESCRIPTION OF THE PREFERRED EMBODIMENTS

Referring to the drawings, in particular, the invention embodied therein in FIG. 1, comprises a gas generator housing and rocket engine generally designated 50 having spaced inner and outer walls 52 and 54 and a central nozzle forming member 8. The nozzle has an opened discharge end 8a, but the walls 52 and 54 or continuations thereof substantially close the remaining portion of the gas generator rocket engine 50.

In accordance with the invention, an injection chamber 1 is provided for a first Monergol mass in a location adjacent the end remote from the nozzle discharge 8a. Into the space 1, the first Monergol mass is directed by the discharge from injection nozzle 2 in an atomized state.

The chamber 1 communicates to an annular passage having a catalyst or a catalyzator passage 3. The atomized Monergol mass 9 flows through the catalyzator 3 and is separated into individual gases and under high heating conditions cracked gases 9a are created.

A nozzle ring and whirl 4 is located adjacent the discharge end 8a of the nozzle at a location around the nozzle walls and in a position to receive the gases 9a to permit them to be directed as indicated by the arrow in FIG. 2 tangentially into an annular chamber 56 located at the lower end of the housing 50 as indicated in FIG. 1. A second partial Monergol mass is introduced through a feed line 6 and an injection nozzle 7 into the annular chamber 56 in the stream of gases 9a. The hot gases 9a which are accelerated by the nozzle ring 4 contact the second partial Monergol mass 10 and are mixed with it into the tangential movement thereof. The two gaseous mediums produced, 9a and 10a, move tangentially upwardly around the nozzle wall 8 as indicated by the arrows in FIG. 1. The space between the nozzle 8 and the wall 52 defines a cyclone chamber 5. The atomized second Monergol mass 10 is added at a location within the confines of the periphery of this whirling stream until the added Monergol mass is thermically separated. Adjacent the concial end portion of the wall 52 the combined gases reverse and flow outwardly through the thrust nozzle 8 and are discharged through the opening 8a.

In the embodiment indicated in FIGS. 3 and 4, there is provided a gas generator rocket engine generally 50'. This generator 50' also includes spaced inner and outer walls 52' and 54'. In this embodiment, a catalyzator 3' is located on the interior of the inner wall 52' and it is advantageously divided up into a plurality of individual segments or compartments by radial walls 58. A first injector chamber 11 is defined between an end portion of the inner wall 52' and an end wall 60 of the catalyzator 3'. A first injection nozzle 12 is provided for injecting a first partial Monergol mass into the injection chamber 11 which communicates with a ring sector 13 of the catalyzator 3'.

Full radial walls 58' divide the section between the interior walls 52' and 54' into four annular sectors including a second mixing chamber portion 14 into which a second injector nozzle 15 directs a second partial Monergol mass. The flow of the gases from the second mixing chamber 14 is through a second catalyzator 16 and into a cyclone 17 arranged centrally within the catalyzator 3'. Swirl impellers 22 are located between the various sectors to impart a swirl to the gases as they enter the cyclone 17. A third injection nozzle 18 is located to discharge a third partial Monergol mass in an axial direction into the cyclone 17. A thrust nozzle 19 connects to the lower end of the cyclone 17 and is provided with an opening 19a for the discharge of the thrust gases.

The atomized Monergol mass 20 which is introduced to the first injection chamber 11 flows through the catalyzator ring section 13 in an axial direction to the opposite end which is closed by a wall 62. During this flow, it is separated into individual gases and under the high heat conditions cracked gases 20a are created. The cracked gases 20a leave in a radial direction from the ring section 13 and enter into the second injection or mixing chamber 14. A second atomized Monergol partial mass 21 is directed into and admixed with the hot cracked gases 20a and is separated thermically by the heat of these gases to form the hot cracked gases 21a.

Both the gases 20a and 21a then flow through the catalyzator ring section 16 which eventually separates the Monergol particles which are still in fluid form. The swirl impellers 22 impart a swirl to the gases 20a and 21a which flow into the cyclone 17. Into this swirl stream, a third Monergol partial mass 23 is injected by the nozzle 18 and it is separated by the heat of the gases 20a and 21a. The thrust nozzle 19 is fed by the aerodynamic and thermaldynamic conditions inside the chamber 22 from the center of the swirling stream; and, through the centrifugal action of this swirling stream, remaining Monergol drops 23 are kept within the confines of the periphery of the swirl stream until they are thermically separated.

If, as a Monergol hydrazine is used, then the mixing ratio of the first and second Monergol masses 9 and 10 is maintained about 1:2 for the embodiments of FIGS. 1 and 2. This means, that only about a third of the entire Monergol mass is fed through the catalyzator 3. Therefore, this catalyzator 3 can be of a considerably smaller dimension than the usual gas generator elements. The heat of the gases of the first Monergol partial mass 9 consisting of only a third of the entire Monergol mass is sufficient to separate thermically the remaining two thirds of the partial Monergol mass which is introduced at the second injection.

In the embodiment according to FIGS. 3 and 4, if a hydrazine is also used, only about 11 percent of the entire Monergol mass is sufficient for the first Monergol partial mass injection at the location of the injector 20. A correspondingly smaller sized catalyzator ring sector 3' is therefore required. The second Monergol partial mass 21 can amount to a maximum of about 22 percent of the entire Monergol mass in order to permit it to be split by the gases 20a of the first Monergol partial mass 20. The gases 20a and 21a of the Monergol masses 20 and 21 are themselves capable of thermically separating the remaining 67 percent which is introduced in the form of a third Monergol partial mass 23.

The second catalyzator ring sector 16 performs a safety purpose inasmuch as they are intended to guarantee a complete separation of the Monergol masses 20 and 21 of the first and second Monergol partial injections 20 and 21 under maximum conditions which are to be the optimum of the installation to be obtained. It is possible, in theory, to keep the first catalyzator very small and to create all following processes purely thermically in the form of cascading admixtures of many partial Monergol masses. Practical considerations put a limit on the number of steps of injections. It lies entirely within the limits of the present invention that instead of a first Monergol partial mass such as the mass 10 or the mass 20 and which are chemically similar to the second and/or third Monergol masses 11 and 21 or 23, to use instead one which comprises the first Monergol mass 10 or 20 and then to add a chemically different second and/or third Monergol mass.

What I claim is:

1. A gas generator particularly for generating thrust gases for rocket motors, comprising a housing, an annular Monergol-mass catalyzer in said housing, said housing having a discharge for gases and spaced inner and outer walls defining a gas passage through said catalyzer to said discharge, means for introducing a first partial fluid Monergol-mass into said housing in an atomized form and for directing it through said catalyzer for generating decomposed gases, and second means between said catalyzer and said discharge for introducing a second partial fluid Monergol mass into said housing into the stream of the decomposed gases generated in said catalyzer by said first partial fluid Monergol-mass, said passage having a cyclone chamber defined around said nozzle member between said nozzle member and said catalyzer, the decomposed gases exiting from said catalyzer flowing along said passage into said cyclone and being discharged into and through said nozzle member.

2. A gas generator for rocket motors, according to claim 1, including an annular nozzle ring disposed between said catalyzer and said nozzle member at a location adjacent said discharge at a position to receive decomposed gases from said catalyzer and to whirl them in a reverse direction through said cyclone, said second means for introducing a second partial Monergol mass comprising a nozzle adapted to discharge the mass in an atomized form in the vicinity of said ring.

3. A gas generator for rocket motors, according to claim 2, including vane ring means in said ring for producing a whirling tangential flow of the decomposed gases and the second partial Monergol mass.

4. A gas generator for rocket motors, according to claim 1, wherein said catalyzer is divided into a plurality of individual sectors said first means being located to direct a first partial Monergol mass through a first one of said sectors, said second means being located to direct a second partial Monergol mass into the decomposed gases after they leave said first sector.

5. A gas generator for rocket motors, according to claim 4, including third means for introducing a third partial Monergol mass into the decomposed gases of generator by catalytic reaction of both said first and said second partial Monergol mass to form decomposed gases.

6. A gas generator for rocket motors, according to claim 5, wherein said third means is arranged to discharge a third Monergol mass substantially axially, said housing including an axially extending central whirl chamber, said passage permitting flow of decomposed gases from the partial sector portions of said catalyzer into said central whirling chamber.

7. A gas generator for rocket motors, according to claim 6, wherein said discharge is formed by a thrust nozzle member and said central whirling chamber is axially aligned with said thrust nozzle member.

8. A gas generator for rocket motors, according to claim 1, wherein said housing includes an outer wall and an inner wall spaced inwardly therefrom, said catalyzer being disposed between said inner and outer wall and arranged for axial flow therethrough, said first means for introducing a first partial Monergol mass being located between said inner and outer walls and arranged to discharge said first partial Monergol mass in a direction to cause it to move into said one end of said catalyzer around the periphery thereof, a thrust nozzle member arranged to extend centrally through said housing and the interior of said interior wall and at a spaced location for said interior wall to define a cyclone chamber between said thrust member and said interior wall, said thrust member having an opening into the interior wall at a location spaced axially from the end of said catalyzer opposite to the end which receives first partial Monergol mass, and a whirl ring disposed between said inner wall and said thrust member at a location to receive decomposed gases from said first partial Mongerol mass.

9. A gas generator for rocket motors, according to claim 8, including nozzle means adjacent said whirl ring comprising said second means for introducing a second partial Mongerol mass.

10. A gas generator for rocket motors, according to claim 1, wherein said catalyzer comprises an annular member located within said housing at a spaced location from the interior walls thereof said housing having a thrust nozzle extending outwardly from one side of said housing and terminating in said discharge, a central substantially cylindrical whirl chamber communicating at its one end with said thrust nozzle and located within said catalyzer, said gas passage means including a first gas passage chamber at the end of said catalyzer opposite to said nozzle discharge into which said first means for introducing a first partial Monergol mass is directed, said passage means also including a passage defined around the periphery of said catalyzer on the side and end thereof remote from said discharge, said second means for introducing a second partial Monergol mass being located to discharge into said second injection chamber, and third means for discharging a third partial Monergol mass axially into said whirl chamber.

References Cited

UNITED STATES PATENTS 2,930,184  3/1960  Plescia _____ 60—39.46
2,972,227  2/1961  Allen _____ 60—39.46

FOREIGN PATENTS 733,385  7/1955  Great Britain _____ 60—39.46

DOUGLAS HART, Primary Examiner

U.S. Cl. X.R.

60—39.46